US005913803A

United States Patent [19]
Moster

[11] Patent Number: 5,913,803
[45] Date of Patent: Jun. 22, 1999

[54] ROW CROP HEADER WITH MULTIPLE ROW CONVEYING SYSTEM

[75] Inventor: Vincent M. Moster, Moline, Ill.

[73] Assignee: Case Corporation, Racine, Wis.

[21] Appl. No.: 08/772,418

[22] Filed: Dec. 23, 1996

[51] Int. Cl.$^6$ .................................................. A01D 45/02
[52] U.S. Cl. ..................................... 56/95; 56/119; 56/80; 56/110; 460/114
[58] Field of Search .................................. 56/64, 94, 95, 56/96, 98, 99, 101, 119, 73, 80, 84, 92, 109, 126, 110; 460/114, 119

[56] References Cited

U.S. PATENT DOCUMENTS

| | | |
|---|---|---|
| Re. 31,063 | 10/1982 | Greiner et al. . |
| Re. 31,064 | 10/1982 | Shriver . |
| 1,586,069 | 5/1926 | Clark et al. . |
| 2,182,772 | 12/1939 | Nightenhelser et al. ............. 56/119 X |
| 2,379,822 | 7/1945 | Mitchell et al. . |
| 2,491,195 | 12/1949 | Messenger et al. . |
| 2,527,786 | 10/1950 | Barkstrom . |
| 2,575,120 | 11/1951 | Peel . |
| 2,826,031 | 3/1958 | Hansen . |
| 2,961,820 | 11/1960 | Hadley . |
| 3,352,093 | 11/1967 | Procter . |
| 3,496,708 | 2/1970 | Bornzin . |
| 3,508,387 | 4/1970 | Wright ......................................... 56/95 |
| 3,528,233 | 9/1970 | Martner et al. . |
| 3,528,234 | 9/1970 | Kowalik et al. . |
| 3,584,444 | 6/1971 | Sammann .................................. 56/119 |
| 3,596,448 | 8/1971 | Van Buskirk ........................... 56/95 X |
| 3,670,482 | 6/1972 | Blanshine et al. . |
| 3,719,034 | 3/1973 | Lange ......................................... 56/119 |
| 3,759,021 | 9/1973 | Schreiner et al. . |
| 3,808,783 | 5/1974 | Sutherland et al. . |
| 3,818,685 | 6/1974 | Stoessel et al. . |
| 3,854,272 | 12/1974 | Lane, III et al. . |
| 3,894,382 | 7/1975 | Jauss . |
| 3,940,913 | 3/1976 | Wallenfang et al. . |
| 3,982,384 | 9/1976 | Rohweder et al. . |
| 4,009,557 | 3/1977 | Reicks . |
| 4,106,270 | 8/1978 | Weigand et al. . |
| 4,227,368 | 10/1980 | Mossman et al. . |
| 4,269,017 | 5/1981 | deBuhr et al. . |
| 4,327,542 | 5/1982 | Van Ginhoven . |
| 4,333,304 | 6/1982 | Greiner et al. . |
| 4,346,548 | 8/1982 | Atkinson ................................... 56/119 |
| 4,429,516 | 2/1984 | Erickson ..................................... 56/95 |
| 4,476,667 | 10/1984 | Moss ..................................... 56/119 X |
| 4,493,181 | 1/1985 | Glendenning et al. . |
| 4,531,351 | 7/1985 | Sousek . |
| 4,538,404 | 9/1985 | Heimark, Jr. et al. .................... 56/119 |
| 4,598,535 | 7/1986 | Sousek . |
| 4,771,592 | 9/1988 | Krone et al. . |
| 4,805,388 | 2/1989 | Kell . |
| 5,060,464 | 10/1991 | Caron . |
| 5,528,887 | 6/1996 | Nagy et al. . |

OTHER PUBLICATIONS

*Farm Show*, vol. 20, No. 5, 1996 — "Build–It–Yourself" Narrow Row Header Kit.
*Ontario Farmer*, vol. 29, No. 40, 1996 — "Thinking 15–inch".
Allis–Chalmers Tractor Division–Milwaukee, U.S.A., "1918–1960, An Informal History", Copyright 1989 by Alan C. King.
Operators Manual, Setting Up Instructions, "McCormick 34HM–21 Corn Snapper (Two Row, Mounted Type)", International Harvester Company (No Date).
Instruction Manual and Parts List, Snapping Unit Frame Field Improvement Parts for (No Date).
McCormick–Deering, No. 14P, No. 24, Corn Pickers, International Harvester Company.
CP–8 McCormick Parts Catalog, 34HM–20 Corn Picker, 34HM–21 Corn Snapper, (No Date).
34HM–22 Sweet Corn Picker (Two Row, Mounted–Type), International Harvester.

*Primary Examiner*—Heather Shackelford
*Attorney, Agent, or Firm*—Foley & Lardner

[57] ABSTRACT

A row crop header for a harvesting machine includes a frame, a first row unit supported by the frame, a second row unit supported by the frame adjacent the first row unit and a multiple row conveyor between the first row unit and the second row unit for conveying crops from the first and second row units.

19 Claims, 4 Drawing Sheets

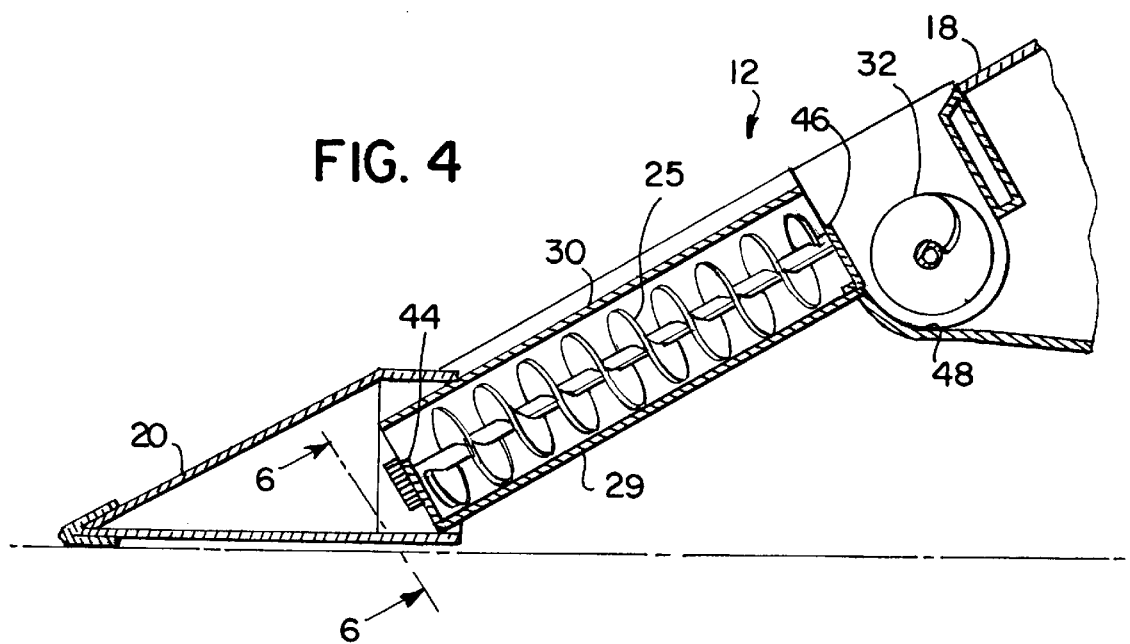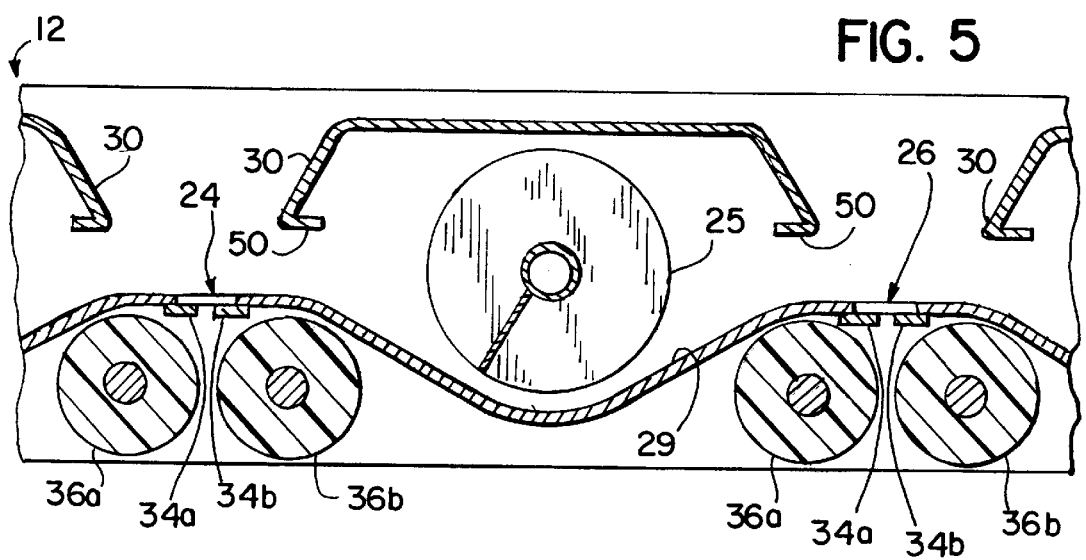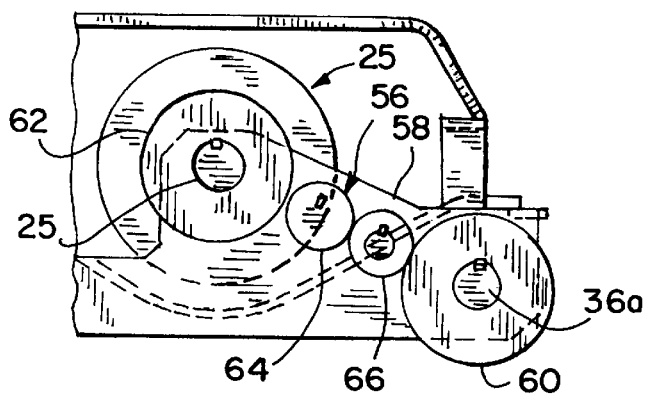

ROW CROP HEADER WITH MULTIPLE ROW CONVEYING SYSTEM

FIELD OF THE INVENTION

The present invention relates to row crop harvesting machines. In particular, the present invention relates to a row crop harvesting machine having a multiple row conveyor for conveying crops from a plurality of row units.

BACKGROUND OF THE INVENTION

Several variations of header units are commonly used in combines or harvesting machines for harvesting row crops such as corn and cotton. One such header unit is a corn head with fixed spacing between the row units. Several other corn heads allowing variable spacing between the row units have also been developed. However, both fixed and variable spacing corn heads are designed to only efficiently harvest corn planted in rows having a row width of greater than 20 inches.

Recent research on the spacing of the corn rows has indicated special benefits for narrower row spacings that are 12–16 inches apart. In addition to the obvious increase in yield and crop population, these benefits include improved erosion control and better weed control. The narrower rows also require less chemicals and pesticides per unit of yield, thereby benefitting the environment.

Unfortunately, the spacing between adjacent row units of existing header units are not designed to harvest rows having a spacing of 16 inches or less. Moreover, modifying the spacing between adjacent row units of existing header units to effectively harvest rows having spacing of 16 inches or less is difficult, if not impossible. The ability to construct row units of existing headers more closely together for row widths of less than 20 inches is inherently limited by the size of row unit components. For example, each individual row unit typically includes two gatherers adapted for moving corn ears or other harvested crop to a rear of the header unit. The conventionally required spacing of the gatherers prevents row units from being constructed closer together for harvesting rows of crops having a spacing of less than 20 inches. As a result, existing header units have sub-optimal harvesting efficiency when harvesting narrow rows.

SUMMARY OF THE INVENTION

The present invention is a row crop header for a harvesting machine. The crop header includes a frame, a first row unit supported by the frame, a second row unit supported by the frame adjacent the first row unit and a multiple row conveyor between the first row unit and the second row unit.

The preferred embodiment of the present invention comprises a corn head configured for engaging cornstalks which support the ears of corn and for removing the ears from the stalks. In particular, the corn head includes stalk or snapping rolls which cooperate with stripper plates to remove ears from the stalks. The multiple row conveyor conveys the ears from a plurality of row units to a cross conveyor which conveys the ears to a central intake of the combine.

BRIEF DESCRIPTION OF THE DRAWINGS

FIG. 4 is a sectional view of the header of FIG. 2 taken along lines 4—4.

FIG. 5 is a cross sectional view of a portion of the header of FIG. 3 taken along lines 5—5 and additionally including the conveyer housing.

FIG. 6 is fragmentary elevational view of the header of FIG. 4 taken along lines 6—6.

DETAILED DESCRIPTION OF THE EMBODIMENTS

Figure 1:
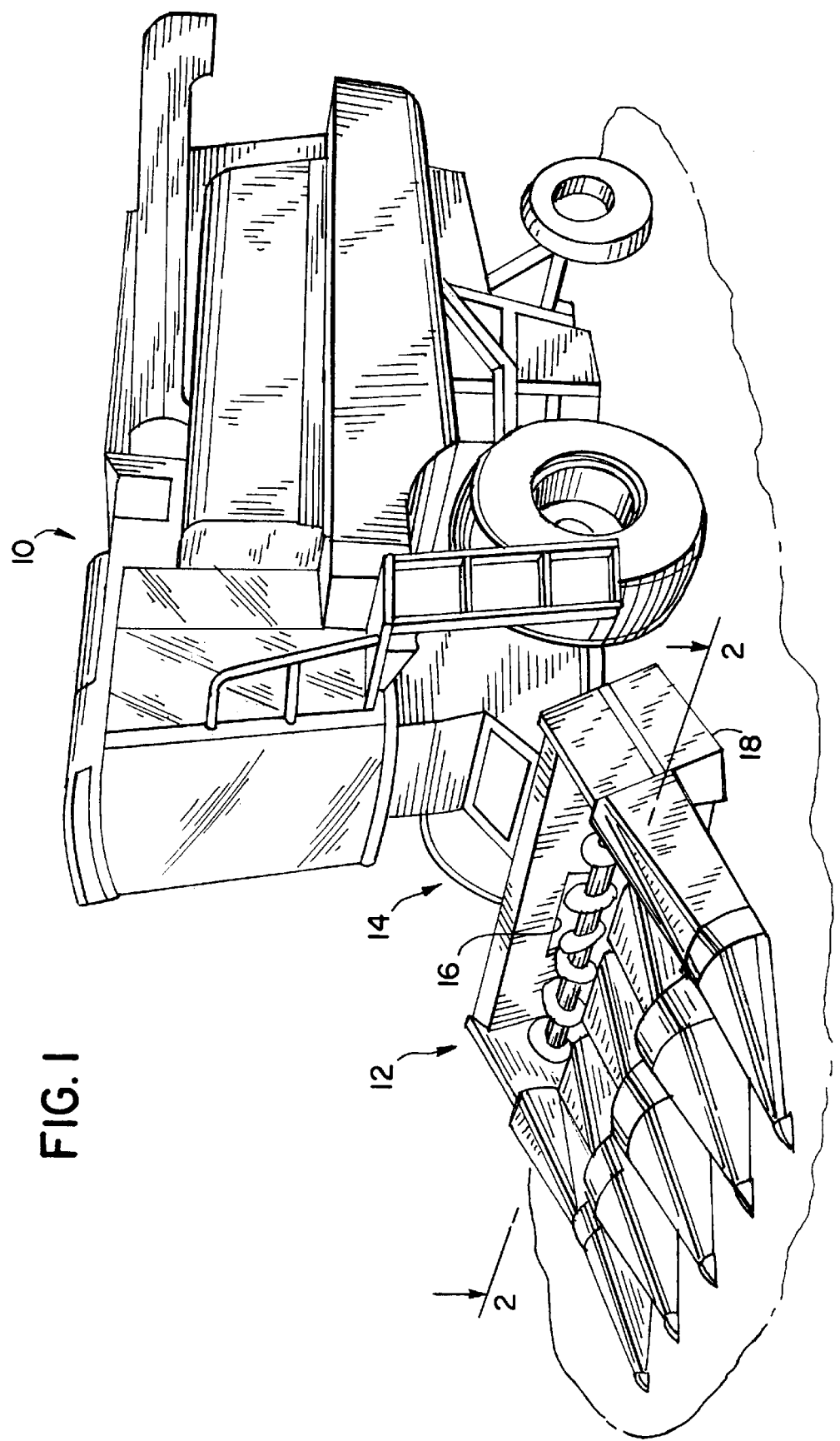
FIG. 1 is a perspective view illustrating an exemplary harvesting machine including a header of the present invention.

FIG. 1 is a perspective view illustrating harvesting machine 10 including header 12. Harvesting machine 10 comprises a conventionally known combine having a front end 14 configured for mounting header 12 and for receiving harvested crops from header 12 through a central intake 16. As conventionally known, combine 10 includes a threshing mechanism for separating the grain or seeds from the remaining straw and chaff. Alternatively, header 12 may be used with a variety of other harvesting machines used for harvesting row crops such as corn pickers and the like.

Header 12 is a row crop harvesting head designed for harvesting multiple crop rows. In the preferred embodiment illustrated, header 12 is a corn head designed for removing ears of corn from the respective stalks and for conveying the removed ears of corn to the central intake 16 of harvesting machine 10.

Figure 2:
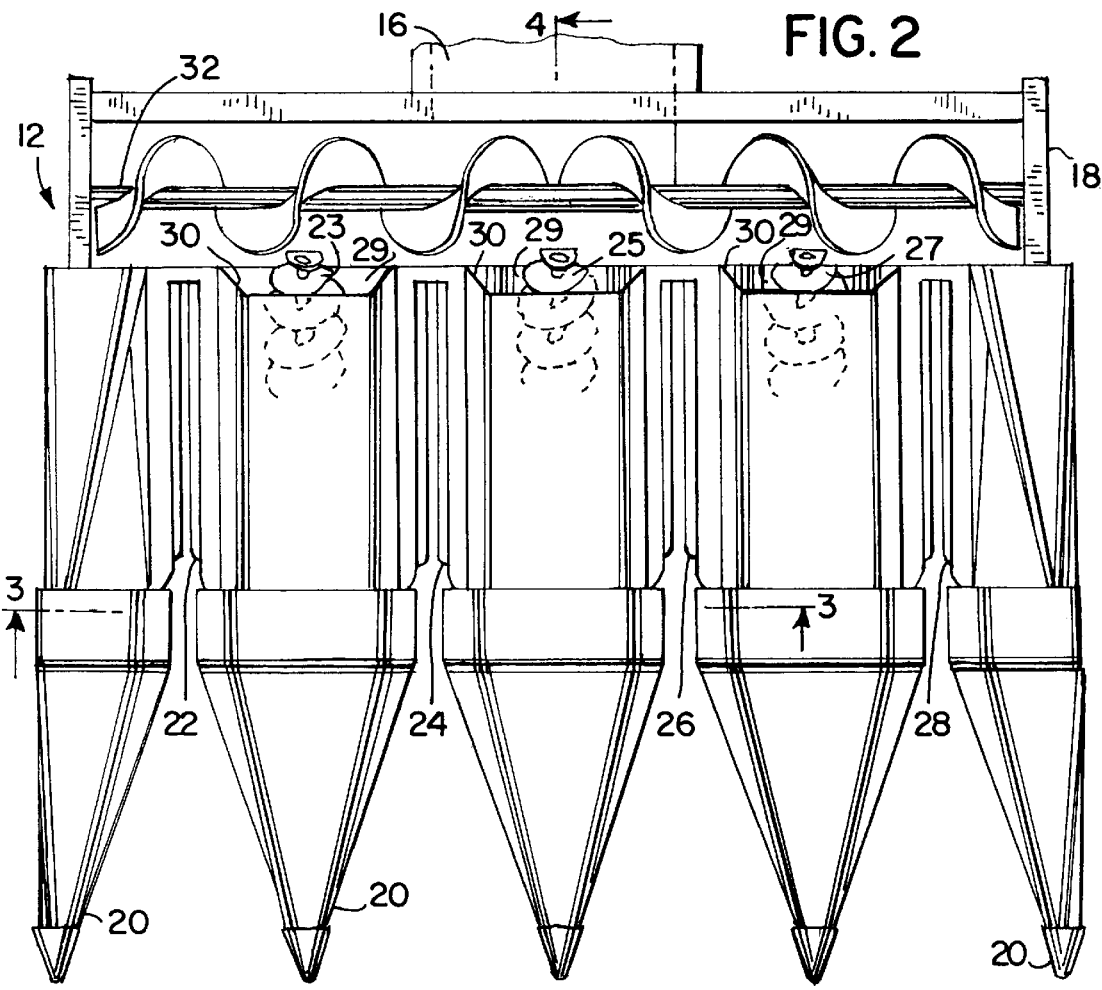
FIG. 2 is a top elevational view of the header separated from the harvesting machine.

FIG. 2 is a top elevational view of header 12 separated from harvesting machine 10. As best shown by FIG. 2, header 12 includes frame 18, divider shields 20, row units 22, 24, 26, 28, conveyors 23, 25, 27, conveyor troughs 29, conveyor shields 30, and cross conveyor 32. Frame 18 is a generally rigid, elongate support structure configured for being mounted to forward end 14 of harvesting machine 10 and for supporting row units 22, 24, 26, 28, row unit conveyors 23, 25, 27, and cross conveyor 32, as well as the other components of header 12. As can be appreciated, frame 18 may have a variety of alternative sizes and configurations depending upon the type of harvesting machine to which header 12 is attached, the particular type of row crops being harvested and the number of row units supported by frame 18.

Divider shields 20 are conventionally known and extend forward and between adjacent row units 22, 24, 26, 28. In the preferred embodiment illustrated, divider shields 20 comprise semi-conical shaped members having noses pointing forward of header 12. Divider shields 20 are supported by frame 18 proximate to the ground surface for lifting cornstalks above the ground surface and for channeling or funneling the corn rows to an intermediate row unit 22, 24, 26, or 28.

Row units 22, 24, 26, 28 are supported by frame 18 between adjacent or consecutive divider shields 20 transversely across header 12. In the preferred embodiment illustrated, row units 22, 24, 26, 28 are closely spaced across header 12. Preferably, row units 22, 24, 26, 28 are spaced apart from one another by a distance no greater than 16 inches for enabling row units 22, 24, 26, 28 to harvest narrower crop rows with increased harvesting efficiency. Each row unit 22, 24, 26, 28 longitudinally extends rearwardly from divider shields 20 toward cross conveyor 32. Each row unit 22, 24, 26, 28 is designed for receiving the corresponding rows of corn channeled by divider shields 20 and for removing the ears of corn from their respective stalks.

Row unit conveyors 23, 25, 27 are mounted to frame 18 and are positioned between adjacent or consecutive row units 22, 24, 26, 28. In particular, row unit conveyor 23 is positioned between row units 22, 24. Row unit conveyor 25 is positioned between row units 24, 26. Row unit conveyor 27 is positioned between row units 26, 28. Row unit conveyors 23, 25, 27 extend generally parallel to row units 22, 24, 26, 28 and are positioned within conveyor troughs 29. Row unit conveyors 23, 25, 27 are also partially housed by conveyor shields 30 extending opposite conveyor troughs 29. Conveyor troughs 29 and conveyor shields 30 are preferably sufficiently spaced from one another for permitting the ears of corn removed by row units 22, 24, 26, 28 to pass therebetween into troughs 29. Row unit conveyors 23, 25, 27 convey the ears of corn from row units 22, 24, 26, 28 to cross conveyor 32.

Because row unit conveyors 23, 25, 27 convey ears of corn removed by row units 22, 24, 26, 28 to cross conveyor 32, the large, complicated and space-consuming gatherer units typically employed in conventional corn heads and other harvesting heads are not required. Because row unit conveyors 25 generally have a smaller width as compared to conventional gatherer units, row units 22, 24, 26, 28 may be more closely spaced relative to one another. Moreover, because each row unit conveyor, 23, 25, 27 conveys ears of corn from two adjacent row units, fewer total row unit conveyors 23, 25, 27 are necessary. As a result, row units 22, 24, 26, 28 may be more closely positioned relative to one another to further enable header 12 to harvest more narrowly spaced crop rows with increased harvesting efficiency.

Cross conveyor 32 preferably comprises an elongate auger rotatably mounted at opposite ends to frame 18. Cross conveyor 32 transversely extends across and adjacent to ends of row unit conveyors 23, 25, 27 so as to receive the corn ears conveyed by row unit conveyors 23, 25, 27. Upon being rotated by a conventional drive mechanism, cross conveyor 32 conveys the ears of corn from row units conveyors 23, 25, 27 to the central intake 16 of harvesting machine 10. Although cross conveyor 32 is illustrated as an auger having oppositely wound vanes for conveying the ears of corn to intake 16, cross conveyor 32 may alternatively comprise any one of a variety of well-known conveying mechanisms such as moving webs or paddles, and the like. As can be appreciated, cross conveyor 32 may be omitted in headers having a limited number of row units and a reduced width.

Figure 3:
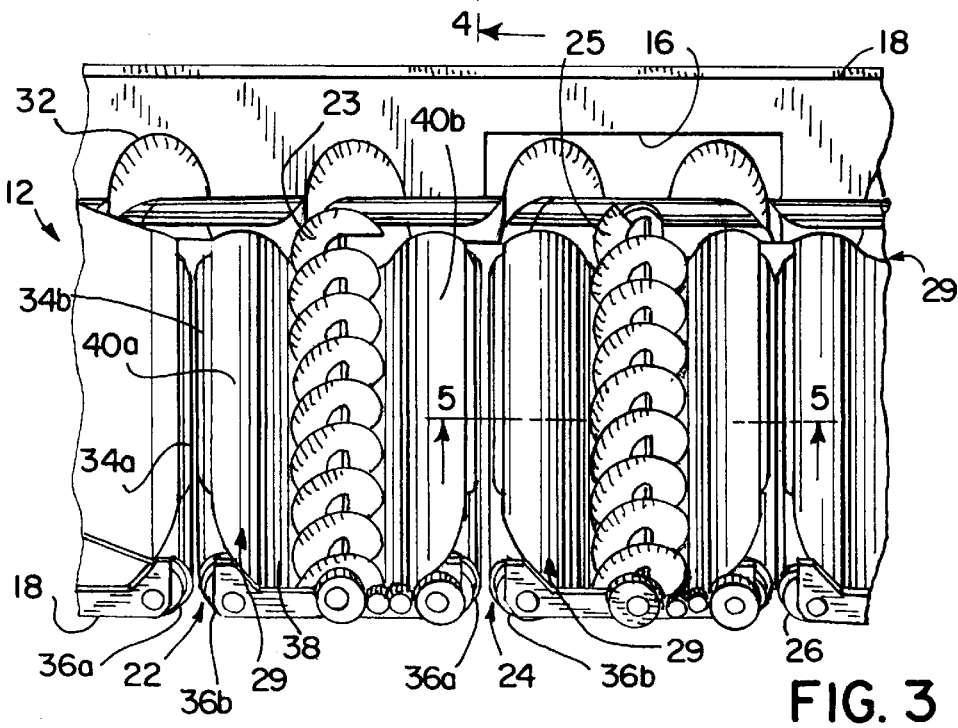
FIG. 3 is a fragmentary perspective view of the header taken along lines 3—3 of FIG. 2.

FIG. 3 is a fragmentary perspective view of header 12 with divider shields 20 and conveyor housings 30 removed for purposes of illustration. FIG. 3 illustrates row units 22, 24, 26, row unit conveyors 23, 25, and conveyor troughs 29 in greater detail. As best shown by FIG. 3, row units 22, 24, 26 each include stripper plates 34a, 34b and snapping or stalk rolls 36a, 36b. Stripper plates 34a, 34b generally comprise elongate flat plates or bars supported by frame 18 along a length of each row unit. Stripper plates 34a, 34b are spaced opposite one another for receiving cornstalks there between. Stripper plates 34a, 34b are preferably adjustable for varying the spacing between stripper plates 34a, 34b to accommodate various harvesting conditions.

Stalk rolls 36a, 36b are conventionally known and are rotatably coupled to frame 18 below stripper plates 34a, 34b. Upon being oppositely rotated by a drive mechanism (not shown) in a conventionally known manner, stalk rolls 36a, 36b engage cornstalks to move the cornstalks toward and between stripper plates 34a, 34b. Stalk rolls 36a, 36b additionally drag and pull the cornstalks downward between stripper plates 34a, 34b to strip ears of corn from the cornstalks. The removed ears of corn fall or roll into conveyor trough 29 for conveyance by row unit conveyors 23, 25.

Conveyor troughs 29 are generally elongate, U-shaped channels supported by frame 18 below and about row unit conveyors 23, 25, 27 (shown in FIG. 2). Each trough 29 includes a floor 38 and a pair oppositely extending side walls 40a, 40b. Each floor 38 extends below a corresponding row unit conveyor 23, 25, 27 and is generally contiguous with side walls 40a, 40b. Side walls 40a, 40b extend opposite one another and are generally slanted at an upward angle relative to floor 38. Side walls 40a, 40b preferably have an upper edge adjacent one of stripper plates 34a, 34b so that ears of corn easily fall into trough 29. Side walls 40a, 40b additionally retain the ears of corn within trough 29 as ears of corn are being conveyed by row unit conveyors 23, 25, 27.

As best shown by FIG. 3, row unit conveyors 23, 25, 27 (shown in FIG. 2) are generally elongate augers rotatably supported at opposite ends by frame 18 within conveyor troughs 29. The vanes of row unit conveyors 23, 25, 27 are preferably angled so that upon rotation of row unit conveyor 23 by drive mechanism 56 (shown in FIG. 6), the vanes convey ears of corn within trough 29 toward cross conveyor 32. Preferably, row unit conveyors 23, 25 extend parallel to and along substantially the entire length of each adjacent row units 22, 24 or 24, 26. Although not illustrated by FIG. 3, row unit 28 and row unit conveyor 27 are substantially identical to row units 22, 24 and row unit conveyors 23, 25, respectively. Although row unit conveyors 23, 25 are illustrated as elongate augers longitudinally extending toward cross conveyor 32, row unit conveyors 23, 25 may alternatively comprise other well-known conveying mechanisms such as webs or paddles driven by a drive mechanism such as a chain and sprocket assembly.

FIGS. 4 and 5 illustrate row unit conveyor 25 and its corresponding conveyor trough 29 and conveyor housing 30 in greater detail. FIG. 4 is a sectional view of header 12 taken along lines 4—4 of FIG. 2. FIG. 5 is a cross-sectional view of a portion of header 12 taken along lines 5—5 of FIG. 3 with conveyor housing 30 included. As best shown by FIG. 4, row unit conveyor 25 is rotatably mounted to a support bracket 44 adjacent divider shield 20 and is rotatably mounted to a support 46 adjacent to cross conveyor 32. Support bracket 44 preferably comprises an elongate plate extending across an end of trough 29 to prevent ears of corn from falling out of trough 29. Bracket 46 is preferably minimally sized for enabling corn ears to flow into trough 48 for being conveyed by cross conveyor 32. As shown by FIG. 4, row unit conveyor 25 and trough 29 extend at a downward angle from cross conveyor 32 toward divider shield 20. Consequently, row unit conveyor 25 conveys ears of corn in an upward, rearward direction from adjacent row units 22, 24, 26, 28 to cross conveyor 32.

As shown by FIG. 5, housing 30 is a generally elongate shallow hood enclosing a top portion of row unit conveyor 25. Housing 30 has lower surfaces 50 sufficiently spaced from opposite surfaces of trough 29 to permit ears of corn removed by stripper plates 34a, 34b and stalk rolls 36a, 36b to roll or fall into trough 29 between trough 29 and housing 30. Housing 30 prevents row unit conveyor 25 from becoming entangled with corn stalks or other chaff. Alternatively, housing 30 may be omitted for enabling ears of corn to more easily flow into trough 29.

FIG. 6 is an elevational view of header 12 taken along lines 6—6 of FIG. 4. FIG. 6 illustrates drive mechanism 56 for rotatably driving row unit conveyor 25. As shown in FIG. 6, drive mechanism 56 includes support bracket 58, drive gear 60, conveyor gear 62 and intermediate gears 64, 66. Support bracket 58 is supported by frame 18 (shown in FIG. 3) and is configured for rotatably supporting extending shaft ends of stalk roll 36a and row unit conveyor 25. Support bracket 58 further rotatably supports shafts of intermediate gear 64, 66 between drive gear 60 and conveyor gear 62.

Drive gear 60 is fixedly coupled to the extending shaft of stalk roll 36a and preferably comprises a spur gear in engagement with intermediate gear 66. Conveyor gear 62 is fixedly coupled to the extending shaft of row unit conveyor 25 and preferably comprises a spur gear in engagement with intermediate gear 64. Intermediate gear 64, 66 preferably comprise spur gears rotatably supported in engagement with each other and in engagement with conveyor gear 62 and drive gear 60, respectively. Gears 60, 62, 64, 66 preferably have diameters sized for rotatably driving conveyor gear 25 at an appropriate revolution speed.

Stalk roll 36a is rotatably driven by a drive mechanism (not shown) in a conventionally known manner. Because drive gear 60 is fixedly coupled to the extending shaft of stalk roll 36a, drive gear 60 rotates with the rotation of stalk roll 36a. Torque from drive gear 60 is transferred across intermediate gears 64, 66 to conveyor gear 62 to rotate row unit conveyor 25. Although not illustrated, drive mechanism 56 is preferably housed within a gear box. Drive mechanism 56 provides a simple and effective means for rotatably driving row unit conveyor 25 with minimal space. Row unit conveyors 23, 27 are similarly provided with drive mechanisms 56. As can be appreciated, a variety of other mechanisms may be used for rotatably driving conveyor gears 60, 62, 64 and 66 such as a series of sheaves and belts.

Figure 7:
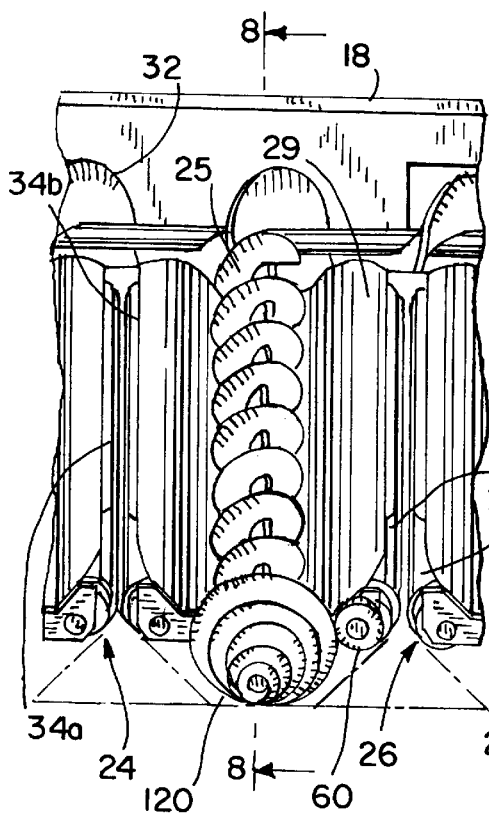
FIG. 7 is a fragmentary perspective view of an first alternative embodiment of the header of FIGS. 1–6.
Figure 9:
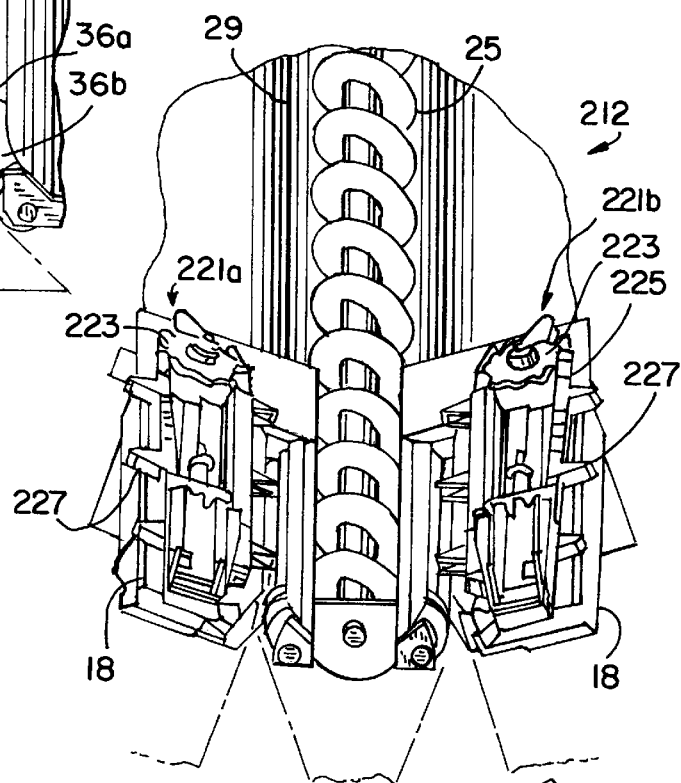
FIG. 9 is a fragmentary perspective view of a second alternative embodiment of the header of FIGS. 1–6.
Figure 8:
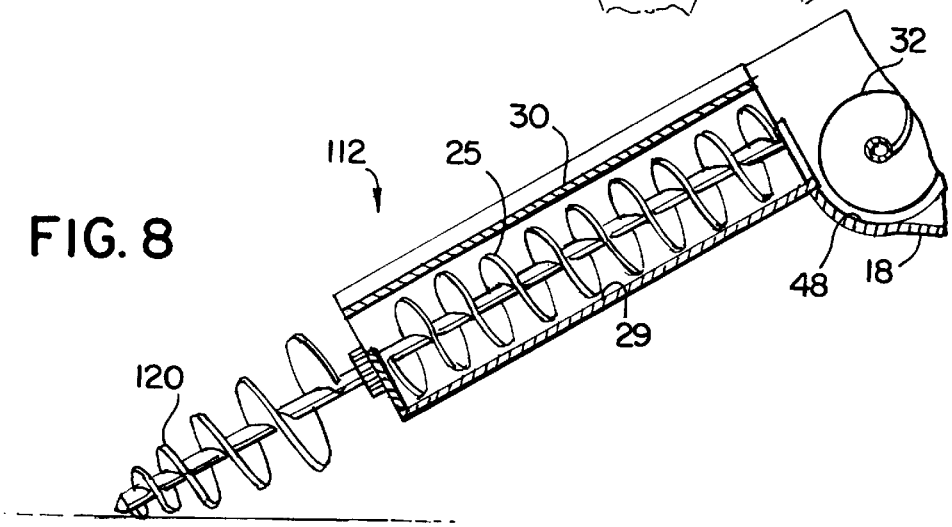
FIG. 8 is a sectional view of the header of FIG. 7 taken along the lines 8—8.

FIGS. 7–9 illustrate alternative embodiments of header 12 including forward end portions designed for directing crop rows into adjacent row units. FIGS. 7 and 8 illustrate header 112, an alternate embodiment of header 12 shown in FIGS. 1–6. Header 112 is similar to header 12 except that row unit conveyors 23, 25, 27 each additionally include nose 120. For ease of illustration, those remaining elements of header 112 which are the same as corresponding elements of header 12 are numbered similarly. Nose 120 is a generally conical-shaped auger fixedly coupled to the extending shaft of row unit conveyor 25. In the preferred embodiment illustrated, nose 120 concentrically extends forward from cross conveyor 25. Alternatively, nose 120 may be configured so as to extend generally parallel to the ground surface. Nose 120 is rotatably driven by drive mechanism 56 (shown in FIG. 6) to provide a "live end" between adjacent row units 24, 26. Nose 120 lifts down cornstalks above the ground's surface and channels the cornstalks toward the adjacent row units 24, 26. Row unit conveyors 23, 27 are similarly provided with noses 120 for lifting and channeling cornstalks toward adjacent row units.

FIG. 9 is a perspective view illustrating header 212, an alternate embodiment of header 12 (shown in FIGS. 1–6). For ease of illustration, those elements of header 212 which are the same as corresponding elements of header 12 are numbered similarly. Header 212 is similar to header 12 except that header 212 additionally includes end gatherers 221a, 221b positioned on opposite sides of cross conveyor 25. End gatherers 221a, 221b each include drive sprocket 223 and gatherer chain 225. Sprocket 223 is rotatably supported by frame 18 and is coupled to a drive mechanism (not shown) similar to those used for driving conventional gatherers. Drive sprocket 223 rotatably drives gatherer chain 225.

Gatherer chain 225 is an elongate chain including outwardly projecting protuberances 227 guided along an elongated oblong oval path adjacent to and above stripper plates 34a, 34b. Protuberances 227 preferably comprise elongate fingers which extend over and between stripper plates 34a, 34b. Alternatively, gatherer chain 225 may comprise other structures such as a belt or rope for carrying protuberances 227 adjacent to and above stripper plates 34a, 34b. Fingers 227 of gatherer chain 225 engage cornstalks to direct the cornstalks into adjacent row units 24, 26. Because gatherers 221a, 221b are not required for conveying the removed ears of corn to cross conveyor 32, the loads or forces placed upon gatherers 221a, 221b are much less than those forces typically applied to conventional gatherers in conventional row units. As a result, gatherers 221a, 221b may be made of smaller and more compact components to maintain the reduced spacing between adjacent row units. To assist the corn ears removed by row units 24, 26 to flow into trough 29, gatherers 221a, 221b are preferably supported by frame 18 at a downwardly converging angle toward trough 29. Gatherers 221a, 221b are further provided with gatherer shields (not shown) to protect gatherers 221a, 221b.

It is to be understood that the foregoing description is of a preferred embodiment of this invention and that the invention is not limited to the specific forms shown. Other embodiments of the corn harvesting head will be apparent to those skilled in the art from consideration of the specification disclosed herein. It is intended that the specification be considered exemplary only, with the true scope and spirit of the invention being indicated by the following claims.

What is claimed is:

1. A row crop header for a harvesting machine, the row crop header comprising:

a frame;

a first row unit supported by the frame;

a second row unit supported by the frame adjacent the first row unit;

an elongated trough between the first row unit and the second row unit, the trough having a bottom surface and at least one upwardly extending sidewall; and a multiple row conveyor between the first row unit and the second row unit, wherein the conveyor includes a moveable crop engaging surface extending non-parallel to the bottom surface to convey crops within the trough from the first and second row units.

2. The row crop header of claim 1 wherein the multiple row conveyor includes an auger.

3. The row crop header of claim 1 including:

a cross conveyor supported by the frame transverse to the multiple row conveyor.

4. The row crop header of claim 3 wherein the cross conveyor includes an auger.

5. The row crop header of claim 1 wherein the first row unit includes:

a stalk roll supported by the first row unit; and a stripper plate cooperatively supported by the first row unit proximate the stalk roll.

6. The row crop header of claim 5 wherein the stalk roll is coupled to the multiple row conveyor such that rotation of the stalk roll rotates the multiple row conveyor.

7. The row crop header of claim 1 wherein the first row unit includes:
   a gatherer supported by the frame, wherein the gatherer moves in a direction along the first row unit and includes outwardly projecting protuberances adapted to engage the crops.

8. The row crop header of claim 1 wherein the multiple row conveyor includes crop engaging surfaces adapted to engage the crops and wherein the header includes:
   a shield supported by the frame above the crop engaging surfaces to partially house the multiple-row conveyor.

9. The row crop header of claim 1 including:
   means for directing crop rows into the first and second row units.

10. The row crop header of claim 9 wherein the means for directing includes:
    a conical auger rotatably supported by the frame forward the first and second row units.

11. The row crop header of claim 10 wherein the multiple row conveyor includes:
    a conveying auger, wherein the conical auger is coupled to the conveying auger such that rotation of the conveying auger rotates the conical auger.

12. The row crop header of claim 9 wherein the multiple row conveyor has a first length that extends from a front end to a rear end of the first row unit and wherein the means for directing including:
    at least one gatherer supported by the frame, wherein the at least one gatherer having a second length less than the first length, wherein the second length extends from the front end and terminates substantially forward the rear end of the row unit and wherein the at least one gatherer moves from the front end towards the rear end to convey crops towards the rear end.

13. The row crop header of claim 1 wherein the bottom surface of the trough is imperforate.

14. Row crop header of claim 1 including:
    a stripper plate along the first row unit, wherein the bottom surface extends below the stripper plate.

15. A row crop header for a harvesting machine, the row crop header comprising:
    a frame;
    a cross conveyor supported by the frame;
    a first row unit supported by the frame forward the cross conveyor and adjacent the first row unit;
    an elongated trough between the first row unit and the second row unit, the trough having a bottom surface and at least one upwardly extending sidewall;
    a multiple row conveyor between the first row unit and the second row unit adapted to convey crops within the trough from the first and second row units to the cross conveyor; and
    a shield supported by the frame above the multiple row conveyor.

16. The row crop header of claim 15 wherein the multiple row conveyor includes an auger.

17. The row crop header of claim 15 wherein the cross conveyor includes an auger.

18. The row crop header of claim 15 wherein the first row unit includes:
    a pair of opposing spaced stripper plates supported by the frame along the first row unit; and
    a pair of stalk rolls rotatably supported by the frame below the stripper plates.

19. A row crop header for a harvesting machine, the row crop header comprising:
    a frame;
    a first row unit supported by the frame;
    a second row unit supported by the frame adjacent the first row unit;
    an elongated trough between the first row unit and the second row unit, the trough having a bottom surface and at least one upwardly extending sidewall; and
    a multiple row conveyor between the first row unit and the second row unit adapted to convey crops from the first and second row units, wherein the multiple row conveyor includes a moveable crop engaging surface extending non-parallel to the bottom surface; and
    a shield supported at a location spaced above the crop engaging surface of the multiple row conveyor by a distance sufficient for allowing crops to be conveyed by the multiple row conveyor beneath the shield.

* * * * *